United States Patent
Garrett (10) Patent No.: US 9,747,086 B2
(45) Date of Patent: *Aug. 29, 2017

(54) TRANSMISSION POINT PATTERN EXTRACTION FROM EXECUTABLE CODE IN MESSAGE PASSING ENVIRONMENTS

(71) Applicant: MICROSOFT TECHNOLOGY LICENSING, LLC, Redmond, WA (US)

(72) Inventor: Charles D. Garrett, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/629,113

(22) Filed: Feb. 23, 2015

(65) Prior Publication Data
US 2016/0034262 A1     Feb. 4, 2016

Related U.S. Application Data

(60) Continuation of application No. 14/248,258, filed on Apr. 8, 2014, now Pat. No. 8,966,460, which is a division of application No. 13/551,529, filed on Jul. 17, 2012, now Pat. No. 8,793,669.

(51) Int. Cl.
*G06F 9/45*     (2006.01)
*G06F 9/44*     (2006.01)

(52) U.S. Cl.
CPC ............. *G06F 8/433* (2013.01); *G06F 8/458* (2013.01); *G06F 9/4428* (2013.01)

(58) Field of Classification Search
CPC ... G06F 9/54; G06F 8/24; G06F 8/458; G06F 8/41; G06F 8/445; G06F 8/52433; G06F 9/45516; G06F 9/4428; G06F 9/465; H04L 69/32
See application file for complete search history.

(56) References Cited

U.S. PATENT DOCUMENTS

| 3,643,227 A | 2/1972 | Smith et al. |
| 4,631,674 A | 12/1986 | Blandy |
| 4,942,512 A | 7/1990 | Kohno |
| 5,379,428 A | 1/1995 | Belo |
| 5,414,848 A | 5/1995 | Sandage et al. |

(Continued)

FOREIGN PATENT DOCUMENTS

| EP | 1912119 | 4/2008 |
| KR | 20010070306 | 7/2001 |

OTHER PUBLICATIONS

Acharya et al, A programmable message classification engine for session initiation protocol (SIP), Dec. 2007, 10 pages.*

(Continued)

*Primary Examiner* — Thuy Dao
(74) *Attorney, Agent, or Firm* — Workman Nydegger (57) ABSTRACT

Extractable annotations are created and stored for different transmission points. In some instances, this occurs during compiling. One type of transmission point is a message being passed to another process. Once the transmission point is identified, a pattern defining output for the transmission point is then identified. A first extractable annotation defining the first patter is then created and stored for subsequent use.

25 Claims, 6 Drawing Sheets

(56) References Cited

U.S. PATENT DOCUMENTS

| | | |
|---|---|---|
| 5,506,987 A | 4/1996 | Abramson et al. |
| 5,768,505 A | 6/1998 | Gilchrist et al. |
| 5,826,081 A | 10/1998 | Zolnowsky |
| 5,900,001 A | 5/1999 | Wolczko et al. |
| 5,903,900 A | 5/1999 | Knippel et al. |
| 6,006,235 A | 12/1999 | Macdonald et al. |
| 6,038,572 A | 3/2000 | Schwartz et al. |
| 6,047,295 A | 4/2000 | Endicott et al. |
| 6,098,080 A | 8/2000 | Endicott et al. |
| 6,104,962 A | 8/2000 | Sastry |
| 6,108,683 A | 8/2000 | Kamada et al. |
| 6,128,642 A | 10/2000 | Doraswamy et al. |
| 6,148,324 A | 11/2000 | Ransom et al. |
| 6,151,701 A | 11/2000 | Humphreys et al. |
| 6,205,471 B1 | 3/2001 | Gilchrist et al. |
| 6,230,183 B1 | 5/2001 | Yocom et al. |
| 6,289,360 B1 | 9/2001 | Kolodner et al. |
| 6,308,319 B1 | 10/2001 | Bush et al. |
| 6,317,756 B1 | 11/2001 | Kolodner et al. |
| 6,421,704 B1 | 7/2002 | Waldo et al. |
| 6,460,068 B1 | 10/2002 | Novaes |
| 6,469,968 B1 | 10/2002 | Van Den Enden et al. |
| 6,484,188 B1 | 11/2002 | Kwong et al. |
| 6,490,599 B2 | 12/2002 | Kolodner et al. |
| 6,490,612 B1 | 12/2002 | Jones et al. |
| 6,516,461 B1 | 2/2003 | Ichisugi |
| 6,519,615 B1 | 2/2003 | Wollrath et al. |
| 6,560,773 B1 | 5/2003 | Alexander, III et al. |
| 6,564,240 B2 | 5/2003 | Waldo et al. |
| 6,658,449 B1 | 12/2003 | Brenner et al. |
| 6,681,220 B1 | 1/2004 | Kaplan et al. |
| 6,681,344 B1 | 1/2004 | Andrew |
| 6,735,769 B1 | 5/2004 | Brenner et al. |
| 6,738,757 B1 | 5/2004 | Wynne et al. |
| 6,738,875 B1 | 5/2004 | Wang |
| 6,748,593 B1 | 6/2004 | Brenner et al. |
| 6,751,711 B1 | 6/2004 | De Buda |
| 6,760,736 B2 | 7/2004 | Waldo et al. |
| 6,763,520 B1 | 7/2004 | Seeds |
| 6,779,182 B1 | 8/2004 | Zolnowsky |
| 6,823,515 B2 | 11/2004 | Leivecchi |
| 6,832,370 B1 | 12/2004 | Srinivasan et al. |
| 6,868,488 B2 | 3/2005 | Garthwaite |
| 6,873,952 B1 | 3/2005 | Bailey et al. |
| 6,892,237 B1 | 5/2005 | Gai et al. |
| 6,912,554 B2 | 6/2005 | Yuasa |
| 6,918,111 B1 | 7/2005 | Damron et al. |
| 6,925,642 B1 | 8/2005 | Commander |
| 6,925,644 B2 | 8/2005 | Waldo et al. |
| 6,954,775 B1 | 10/2005 | Shanklin et al. |
| 6,981,258 B1 | 12/2005 | Takakura |
| 6,986,140 B2 | 1/2006 | Brenner et al. |
| 6,993,767 B2 | 1/2006 | Brenner et al. |
| 6,996,625 B2 | 2/2006 | Kaplan et al. |
| 6,999,979 B2 | 2/2006 | Garthwaite |
| 7,003,760 B1 | 2/2006 | Das |
| 7,016,923 B2 | 3/2006 | Garthwaite |
| 7,031,990 B2 | 4/2006 | Garthwaite |
| 7,035,884 B2 | 4/2006 | Garthwaite |
| 7,058,670 B2 | 6/2006 | Garthwaite |
| 7,062,518 B2 | 6/2006 | Garthwaite |
| 7,062,519 B2 | 6/2006 | Garthwaite |
| 7,069,279 B1 | 6/2006 | Rau et al. |
| 7,069,280 B2 | 6/2006 | Garthwaite |
| 7,069,281 B2 | 6/2006 | Garthwaite |
| 7,092,978 B2 | 8/2006 | Garthwaite |
| 7,096,238 B2 | 8/2006 | Garthwaite |
| 7,136,887 B2 | 11/2006 | Garthwaite |
| 7,143,124 B2 | 11/2006 | Garthwaite |
| 7,152,229 B2 | 12/2006 | Chong et al. |
| 7,188,129 B2 | 3/2007 | Garthwaite |
| 7,207,038 B2 | 4/2007 | Bicsak et al. |
| 7,209,935 B2 | 4/2007 | Garthwaite |
| 7,225,439 B2 | 5/2007 | Garthwaite |
| 7,228,541 B2 | 6/2007 | Gupton et al. |
| 7,251,815 B2 | 7/2007 | Donovan et al. |
| 7,308,466 B2 | 12/2007 | Houldsworth |
| 7,380,005 B1 | 5/2008 | Li et al. |
| 7,395,258 B2 | 7/2008 | Altinel et al. |
| 7,404,182 B1 | 7/2008 | Garthwaite |
| 7,406,685 B2 | 7/2008 | Fleehart et al. |
| 7,412,580 B1 | 8/2008 | Garthwaite |
| 7,441,240 B2 | 10/2008 | Amano et al. |
| 7,444,644 B1 | 10/2008 | Slaughter et al. |
| 7,487,237 B2 | 2/2009 | Lloyd et al. |
| 7,487,247 B1 | 2/2009 | Li et al. |
| 7,503,039 B2 * | 3/2009 | Inoue ................ G06F 8/45 717/151 |
| 7,565,386 B2 | 7/2009 | Joisha |
| 7,565,499 B1 | 7/2009 | Garthwaite |
| 7,599,973 B2 | 10/2009 | Detlefs et al. |
| 7,613,753 B2 | 11/2009 | Cornet et al. |
| 7,640,544 B2 | 12/2009 | Flood et al. |
| 7,676,664 B2 | 3/2010 | Kissell |
| 7,797,670 B2 | 9/2010 | Bumgarner et al. |
| 7,814,211 B2 * | 10/2010 | Vernal ................ G06F 9/465 370/352 |
| 7,840,966 B2 | 11/2010 | Dodge et al. |
| 7,865,707 B2 | 1/2011 | Bittlingmayer et al. |
| 7,869,363 B2 | 1/2011 | Shamilian et al. |
| 7,870,554 B2 | 1/2011 | Dodge et al. |
| 7,890,712 B2 | 2/2011 | Bitner et al. |
| 7,945,577 B2 | 5/2011 | Altinel et al. |
| 7,949,720 B2 * | 5/2011 | Vernal ................ G06F 9/465 707/999.01 |
| 7,984,083 B2 | 7/2011 | Bacon et al. |
| 7,996,446 B2 | 8/2011 | Bacon et al. |
| 8,010,822 B2 | 8/2011 | Marshall et al. |
| 8,028,277 B2 | 9/2011 | Breitgand et al. |
| 8,108,863 B2 | 1/2012 | Rakvic et al. |
| 8,122,439 B2 | 2/2012 | Cascaval et al. |
| 8,190,939 B2 | 5/2012 | Fields, Jr. et al. |
| 8,195,859 B2 | 6/2012 | Le Moal |
| 8,266,604 B2 | 9/2012 | Groff et al. |
| 8,381,202 B2 * | 2/2013 | Papakipos .............. G06F 8/45 717/149 |
| 8,429,630 B2 | 4/2013 | Nickolov et al. |
| 8,443,348 B2 * | 5/2013 | McGuire ................ G06F 8/45 312/200 |
| 8,495,598 B2 | 7/2013 | Gounares et al. |
| 8,516,463 B2 | 8/2013 | Oliva |
| 8,595,743 B2 | 11/2013 | Gounares et al. |
| 8,607,018 B2 | 12/2013 | Gounares et al. |
| 8,615,766 B2 | 12/2013 | Gounares et al. |
| 8,620,863 B2 * | 12/2013 | Arthursson .......... G06F 9/45504 707/613 |
| 8,650,538 B2 | 2/2014 | Gounares et al. |
| 8,656,134 B2 | 2/2014 | Gounares et al. |
| 8,656,135 B2 | 2/2014 | Gounares et al. |
| 8,656,378 B2 | 2/2014 | Gounares et al. |
| 8,739,183 B2 * | 5/2014 | Purdy .................. G06F 9/465 719/315 |
| 8,793,669 B2 | 7/2014 | Garrett |
| 8,910,190 B2 * | 12/2014 | McClain ............... F16L 23/036 717/146 |
| 9,037,726 B2 * | 5/2015 | Panec .................. G06F 9/465 380/277 |
| 9,201,711 B2 * | 12/2015 | Ahmed ................ G06F 9/54 |
| 2002/0129340 A1 | 9/2002 | Tuttle |
| 2003/0200356 A1 | 10/2003 | Hue |
| 2003/0212731 A1 | 11/2003 | Brenner et al. |
| 2004/0025163 A1 | 2/2004 | Babutzka et al. |
| 2004/0031035 A1 | 2/2004 | Shiu et al. |
| 2004/0158831 A1 | 8/2004 | Amano et al. |
| 2004/0194104 A1 | 9/2004 | Beresnevichiene et al. |
| 2004/0225996 A1 | 11/2004 | Venkatesan et al. |
| 2005/0018695 A1 | 1/2005 | Ramaswamy et al. |
| 2005/0060697 A1 | 3/2005 | Bicsak et al. |
| 2005/0071847 A1 | 3/2005 | Bentley et al. |
| 2005/0166193 A1 | 7/2005 | Smith et al. |
| 2005/0210472 A1 | 9/2005 | Accapadi et al. |
| 2005/0229165 A1 | 10/2005 | Ma et al. |
| 2005/0289252 A1 | 12/2005 | Kim et al. |

(56) References Cited

U.S. PATENT DOCUMENTS

| | | |
|---|---|---|
| 2006/0064313 A1 | 3/2006 | Steinbarth et al. |
| 2006/0179427 A1 | 8/2006 | Underseth et al. |
| 2006/0206881 A1 | 9/2006 | Dodge et al. |
| 2006/0212945 A1 | 9/2006 | Donlin et al. |
| 2006/0253846 A1 | 11/2006 | Ogata et al. |
| 2006/0294167 A1 | 12/2006 | Borman et al. |
| 2007/0061788 A1 | 3/2007 | Dodge et al. |
| 2007/0061809 A1 | 3/2007 | Dodge et al. |
| 2007/0177590 A1* | 8/2007 | Vernal ............... G06F 9/465 370/389 |
| 2007/0206611 A1 | 9/2007 | Shokri et al. |
| 2007/0226739 A1 | 9/2007 | Dodge et al. |
| 2007/0288911 A1 | 12/2007 | Martin et al. |
| 2008/0028391 A1 | 1/2008 | Nallipogu et al. |
| 2008/0126453 A1 | 5/2008 | Cornet et al. |
| 2008/0139191 A1 | 6/2008 | Melnyk et al. |
| 2008/0209395 A1 | 8/2008 | Ernst |
| 2008/0235701 A1 | 9/2008 | Danko |
| 2008/0244565 A1 | 10/2008 | Levidow et al. |
| 2008/0271030 A1 | 10/2008 | Herington |
| 2008/0271032 A1 | 10/2008 | Twaddle |
| 2009/0049421 A1 | 2/2009 | Meijer et al. |
| 2009/0083746 A1 | 3/2009 | Katsumata |
| 2009/0089552 A1 | 4/2009 | Inchingolo et al. |
| 2009/0089771 A1 | 4/2009 | Gill et al. |
| 2009/0119774 A1 | 5/2009 | Moss |
| 2009/0219814 A1 | 9/2009 | Shamilian et al. |
| 2009/0235251 A1 | 9/2009 | Li et al. |
| 2009/0296573 A1 | 12/2009 | Shamilian et al. |
| 2010/0018701 A1 | 1/2010 | Peter et al. |
| 2010/0318630 A1 | 12/2010 | Howell et al. |
| 2010/0333109 A1 | 12/2010 | Milnor |
| 2011/0035735 A1 | 2/2011 | Kramp et al. |
| 2011/0067030 A1 | 3/2011 | Isard et al. |
| 2011/0078699 A1 | 3/2011 | Donlin et al. |
| 2011/0107342 A1 | 5/2011 | Dodge et al. |
| 2011/0154348 A1 | 6/2011 | Elnozahy et al. |
| 2011/0191783 A1 | 8/2011 | Le Moal |
| 2011/0197174 A1 | 8/2011 | Wu |
| 2011/0276832 A1 | 11/2011 | Schneider et al. |
| 2012/0047514 A1 | 2/2012 | Seo et al. |
| 2012/0144376 A1 | 6/2012 | Van Elijndhoven et al. |
| 2012/0204189 A1 | 8/2012 | Eichenberger et al. |
| 2012/0222019 A1 | 8/2012 | Gounares et al. |
| 2012/0222043 A1 | 8/2012 | Gounares et al. |
| 2012/0227040 A1 | 9/2012 | Gounares et al. |
| 2012/0233592 A1 | 9/2012 | Gounares et al. |
| 2012/0233601 A1 | 9/2012 | Gounares et al. |
| 2012/0284730 A1 | 11/2012 | Decusatis et al. |
| 2012/0297163 A1 | 11/2012 | Breternitz et al. |
| 2012/0317371 A1 | 12/2012 | Gounares et al. |
| 2012/0317389 A1 | 12/2012 | Gounares et al. |
| 2012/0317421 A1 | 12/2012 | Gounares et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0324454 A1 | 12/2012 | Gounares et al. |
| 2013/0055278 A1 | 2/2013 | Zaitsev |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares et al. |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013309 A1 | 1/2014 | Gounares et al. |
| 2014/0013311 A1 | 1/2014 | Garrett et al. |
| 2014/0019598 A1 | 1/2014 | Krajec et al. |
| 2014/0019756 A1 | 1/2014 | Krajec et al. |
| 2014/0019879 A1 | 1/2014 | Krajec et al. |
| 2014/0019985 A1 | 1/2014 | Krajec et al. |
| 2014/0025572 A1 | 1/2014 | Krajec et al. |
| 2014/0026142 A1 | 1/2014 | Gounares et al. |
| 2014/0040591 A1 | 2/2014 | Gounares et al. |
| 2014/0298304 A1 | 10/2014 | Garrett et al. |
| 2015/0193286 A1* | 7/2015 | Michael ............... G06F 8/31 719/313 |

OTHER PUBLICATIONS

Lerner et al, Searching for type-error messages, Jun. 2007, 10 pages.*
"International Search Report and Written Opinion Issued in PCT Application No. PCT/US2012/066098", Mailed Date: Mar. 12, 2013, 8 Pages.
Happe et al. "A Pattern-Based Performance Completion for Message-Oriented Middleware" Jun. 2008, 12 pages.
Cheng et al. "Automatic Enactment of Message Exchange Pattern for Web Services" Mar. 2007, 5 pages.
Marrero et al. "On the Definition of Patterns for Semantic Annotation" Oct. 2010, 2 pages.
Giunta et al. "Using Aspects and Annotations to Separate Application Code from Design Patterns" Mar. 2010, 7 pages.
Mei et al. "Generating Semantic Annotations for Frequent Patterns with Context Analysis" 2006, 10 pages.
International Search Report and Written Opinion from PCT/US2012/056707, Feb. 5, 2013.
International Search Report and Written Opinion from PCT/US2013/037310, Jun. 26, 2013.
International Search Report and Written Opinion from PCT/US2012/056711, Mar. 22, 2013.
Van Dongen et al. "A Meta Model for Process Mining Data" 2005.
Lenoski et al. "The Stanford Multiprocessor" Mar. 1992, IEEE.
Kistler "Continuous Program Optimization: A Case Study" ACM Transactions on Programming Languages and Systems, vol. 25, No. 4, Jul. 2003, pp. 500-548.
Li et al. "Efficient Operating System Scheduling for Performance-Asymmetric Multi-Core Architectures" Copyright 2007, ACM.
Wang et al. "Using Dataflow Information to Improve Inter-Workflow Instance Concurrency" 2005, IEEE.
U.S. Appl. No. 13/551,529, Oct. 16, 2013, Office Action.
U.S. Appl. No. 13/551,529, Jan. 27, 2014, Office Action.
U.S. Appl. No. 13/551,529, May 16, 2014, Notice of Allowance.
U.S. Appl. No. 14/248,258, Sep. 10, 2014, Office Action.
U.S. Appl. No. 14/248,258, Dec. 24, 2014, Notice of Allowance.

* cited by examiner

TRANSMISSION POINT PATTERN EXTRACTION FROM EXECUTABLE CODE IN MESSAGE PASSING ENVIRONMENTS

CROSS REFERENCE TO RELATED APPLICATIONS

This application is a Continuation of U.S. patent application Ser. No. 14/248,258 filed Apr. 8, 2014 entitled "TRANSMISSION POINT PATTERN EXTRACTION FROM EXECUTABLE CODE IN MESSAGE PASSING ENVIRONMENTS". Application Ser. No. 14/248,258 is a divisional application of U.S. Pat. No. 8,793,669 entitled "PATTERN EXTRACTION FROM EXECUTABLE CODE IN MESSAGE PASSING ENVIRONMENTS" issued Jul. 29, 2014.

BACKGROUND

Message passing environments are a computer programming paradigm where multiple processes pass information between themselves. A message passing interface often handles the message passing operations. In many cases, message passing environments may perform several processes in parallel.

In a message passing environment, a process may wait for input from another process. The process may wait for a message that matches a pattern of inputs. When the message matches the pattern, the process may consume the message and continue operations.

Message passing environments may be implemented in a single computer. In such environments, a set of processes may execute on a single device. As those processes complete some tasks, a message may be generated that is passed to another process. The receiving process may then consume the message and continue processing. In many cases, the message may contain data that the receiving process may consume.

Other message passing environments may be implemented across a network with many computers. In such environments, a computer system may have a process that creates messages that are consumed by processes on other computer systems. The messages may be passed on a network that may connect all of the computers executing related processes.

SUMMARY

The patterns of data expected by waiting processes in a message passing system may be extracted from the executable code. Some or all of the extraction may be performed during compilation, although some cases may be performed at runtime or during execution. A first pass analysis may occur during compilation, and breadcrumbs or descriptors of message patterns may be stored in the compiled code. A process scheduler or other execution-time analysis may complete the pattern, as some values may not be known until execution. The patterns may be used for managing processes in a message passing environment in several different scenarios.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A process scheduler may compare incoming messages to patterns in a process that is in a blocked state. When an incoming message matches the pattern of data for which a process has been waiting, the process may be moved to a runnable queue and may be executed by a processor. When the process is in a blocked state awaiting input, the process may be stored in an idle queue and may not be executed.

In many execution systems where independent processes are executed, a process may receive data from other processes. Some embodiments may have an explicit message passing system that may route messages from one process to another. Other embodiments may have an implicit message passing system where one process may wait for output from another process.

An explicit message passing system may contain data that may be consumed by a receiving process. In some embodiments, the message may be addressed to a specific receiving process, while in other embodiments, a message may be matched to any receiving process that may consume a specific pattern of data.

The matching process may examine a message and compare the message to a pattern of data for which a process may be waiting. The pattern may be extracted from the process and used as metadata describing the various functions or hold points in the process. The comparison may attempt to match a given message with a pattern identified by an execution pointer at a hold point in a process. When a match is successful, the process may be executed.

Once a process has reached a point where the process may be waiting for data from another process, the process may be placed in an idle queue. Processes in an idle queue may not be executed until moved into a runnable queue.

The matching process may occur without bringing the waiting processes into an executable state. In embodiments where large numbers of processes may exist, the matching process may eliminate computationally expensive mechanism of awaking each waiting process. The matching process may use a data structure that includes the data patterns for which processes are waiting, and a matching process may scan the data structure to find a matching data pattern. Once a match is identified, the corresponding process may be caused to execute.

Causing a process to execute may merely involve placing the process in a runnable queue. A runnable queue may be a process scheduling mechanism by which a process that becomes idle may request a work item. The work item may be the process in the runnable queue. In some multiprocessor environments, multiple runnable queues may be defined for each processor or for groups of processors. In other multi-processor environments, all processors may share a single runnable queue.

In some embodiments, a process that has a successful match may be prioritized to execute quickly. One such mechanism may be to raise the process's status in the runnable queue, such as placing the process at the top of a runnable queue. Another mechanism may be to set the priority of the process to a high level.

The metadata used in the comparison mechanism may be extracted at runtime. In some embodiments, the patterns used for comparison may be identified during a compilation process and stored for easy retrieval. During runtime, the pattern may be readily extracted from the executable code, metadata file, or other database. The compilation may occur using source code, intermediate code, or some other form of computer code.

When a compiler identifies a pattern for which a hold may occur, some of the pattern may be known at compile time and some of the pattern may not be known. When portions of the pattern are not known, the pattern may include pointers to data objects. The pointers may be traversed at runtime to retrieve data values for the pattern. The data values may be incorporated into the pattern and stored for comparison to incoming messages.

Throughout this specification and claims, the term 'message' is used to indicate information for which a process may wait. In some cases, the message may be a discrete and explicit message that may be transmitted through a communications mechanism from one process to another. In other cases, the message may be an interrupt that may be triggered by a peripheral device, such as a network interface card, storage device, input/output device, or other mechanism. In still other cases, the message may be an interrupt, daemon, or other message where the message may be implied. Some such embodiments may have a monitoring agent that may identify interrupts, memory object releases, or other items and create a message for analysis.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
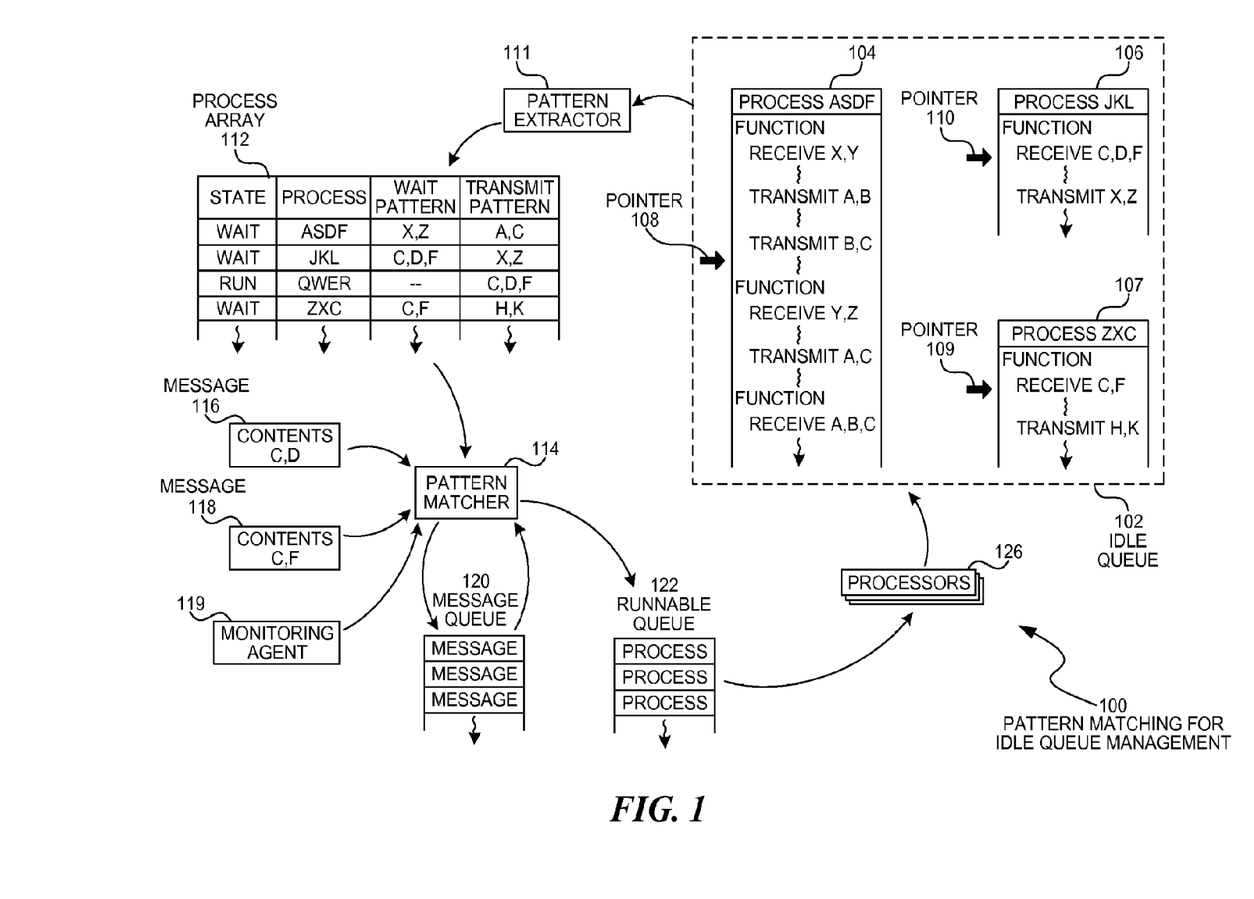
FIG. 1 is a diagram illustration of an embodiment showing pattern matching for idle queue management.

FIG. 1 is a diagram of an embodiment 100 showing various components that may allow for analyzing messages while processes are in an idle queue. Embodiment 100 shows a basic flow of information between various components that may be part of an execution environment.

The components illustrated in embodiment 100 may be elements of an operating system, runtime execution environment, or other components that execute an application. An application may be made up of multiple processes, and those processes may communicate by passing messages. The messages may transmit data, acknowledgements, interrupts, or other information between processes.

Some message passing systems may have explicit messages. Such systems may transmit and route information from one process to another, and many such systems may have sophisticated routing mechanisms that have addressing schemes, buffering mechanisms, and other features.

Some message passing systems may have implicit messages. Implicit messages may be data that one process may be awaiting from another process. The data may be, for example, a memory object that a first process may consume before proceeding. The memory object may have a block placed on it by a second process. The block may indicate that the second process intends to update the memory object. When the block is lifted, an implicit message may be transmitted to the first process to resume processing.

Embodiment 100 illustrates a system where the idle processes may be left in an idle state and when a message is received that an idle process may consume, the idle process may be moved to a runnable queue and resume processing.

The mechanisms of embodiment 100 may speed up the process of matching incoming messages with idle processes. In systems without the mechanisms of embodiment 100, each idle process may be awakened and may check an incoming message. The process of awakening each process may involve loading the process into a processor's executable buffer, performing a comparison with the incoming message, and, when the match is not successful, returning the process to an idle state.

Such systems may have reasonable performance when the number of idle processes is small. However, for computing paradigms with large numbers of interrelated processes, the awakening of each process for comparison with an incoming message may be computationally expensive.

The nomenclature of a blocked process may be known as an idle process, waiting process, or other name in different computing paradigms. For the purposes of this specification and claims, the terms "idle process", "waiting process", "sleeping process", and "blocked process" are considered interchangeable. Still other computing paradigms may have other terminologies for the same concept.

An idle queue 102 may contain two processes 104 and 106. The idle queue 102 may contain any process that is waiting input from some other source. In some cases, the process may be waiting for output of another process, while in other cases, the process may be waiting for an interrupt, memory lock to be lifted, a state change of a memory object, or other input.

In some embodiments, a single process may be made up of many different functions. For example, process 104 is illustrated as having three functions. Each function may have a specific pattern of input objects that the function may consume and a pattern of output objects that the function may transmit. For example, process 104 has a function that consumes X, Y and transmits A, B at one location and transmits B, C at a second location. A second function consumes Y, Z and transmits A, C, and a third function consumes A, B, C and may not transmit any pattern. In still another example, process 109 may receive C, F and transmit H, K.

The values or objects represented by the letter combinations of X, Y in the example of embodiment 100 are used to illustrate any type of data object, interrupt, or information that may form a pattern that may match a message. The terminology is used here merely as a placeholder for a mechanism to define a pattern.

Each computer language may have its own mechanism for defining what a function may consume and transmit. In one example, a pattern may define a set of data types that a function may consume or transmit. In another example, a function may consume a specific interrupt or may be ready to launch when a memory object contains a specific value or range of values. Other computer languages may define data elements, addresses, interrupts, or other information that may be consumed and transmitted.

In some embodiments, each process 104, 106, and 107 may have pointers 108, 110, and 109, respectively, that may indicate a blocking point in the process. The pointers may refer to a function call or other position in a sequence of executable elements where the process has halted, awaiting input. At each pointer, there may be some definition of the input for which the process has halted.

A process array 112 may contain the patterns and process associated with each pointer. The process array 112 may be populated by a pattern extractor 111 that may determine that a process has been blocked or halted, extract the input that the halted process awaits, and place that information in a process array 112.

In the process array 112, an entry of a wait pattern X, Y from the process ASDF corresponds to pointer 108, and an entry of C, D, F from the process JKL corresponds to pointer 106.

The process array 112 may also include transmit patterns, which may refer to patterns that the process may transmit when the next function is executed. The transmit patterns may be extracted from the processes in the same manner as the wait patterns. The process array 112 includes transmit patterns A, C and X, Z, corresponding to processes ASDF and JKL, respectively.

In some embodiments, a process array 112 may permit a one-to-many relationship between a process and its output or transmit patterns. For example, the first function in process ASDF may have two transmit statements, meaning that two sets of output patterns may be present. Each output pattern may generate a separate message and may therefore comprise multiple entries in the process array 112.

The process array 112 may include both waiting processes and running processes. When both running processes and waiting processes are present, a process scheduler may traverse the process array 112 to identify upstream processes that may feed information to a waiting process. The process scheduler may then raise the priority of one or more upstream processes in order to speed up execution of the waiting process.

A pattern matcher 114 may receive incoming messages and attempt to match the incoming message to the pattern in the process array 112. When a match is found, the matching process may be moved to a runnable queue 122, and one of the processors 126 may resume executing the process. When a match is not found, the message may be moved to a message queue 120.

The pattern matcher 114 may also operate by receiving an idle process with an associated pattern. The pattern matcher 114 may compare the pattern to the messages in the message queue 120. If a match is found, the message may be communicated to the process, and the process may be moved to the runnable queue 122.

The message queue 120 may store messages that have no matching idle or waiting process. As changes are made to the process array 112, the message queue 120 may be scanned to attempt to match a newly idle process to a message in the message queue 120.

A monitoring agent 119 may create messages that a pattern matcher 114 may compare against the process array 112. The monitoring agent 119 may monitor interrupts and other inputs, then create a message for analysis by the pattern matcher 114. In some cases, the monitoring agent may monitor a direct memory access location and may create a message when the direct memory access location has new data. In another case, the monitoring agent may monitor a hardware interrupt and may create a message in response.

The messages 116 and 118 may have contents that may be matched against the process array 112 by the pattern matcher 114. The contents of message 116 contain C, D which may not match any process in the process array 112. Consequently, the pattern matcher 114 may move message 116 to the message queue 120.

The contents of message 118 may contain C, F which may match the process ZXC in the process array 112. In this condition, process ZXC may be moved to the runnable queue 122 to resume execution.

A process scheduler may examine the process array to determine that process ASDF is waiting for a pattern X, Y. The process scheduler may search for pattern X, Y in the transmit or output column to determine that process JKL can supply pattern X, Y, but that process JLK is in turn waiting for pattern C, D, F. Another iteration through the process array 112 may reveal that process QWER can supply the pattern C, D, F. The process scheduler may attempt to prioritize process QWER so that processes JKL and ASDF may execute sooner.

The runnable queue 122 may contain processes that may be retrieved by a processor 126 for execution. In some embodiments, each processor may have its own runnable queue 122. In other embodiments, multiple processors may share a single runnable queue 122, where any of the processors may be capable of executing a process in the runnable queue 122. In still other embodiments, a computer system may have multiple runnable queues, and some or all of the runnable queues may be shared by multiple processors.

The pattern matcher 114 may compare messages with patterns extracted from the waiting processes. The comparison may occur without having to awaken the idle processes, which may be useful in computing systems that use large numbers of independent processes. One example of such systems may be functional programming systems, where a single application may have many hundreds, thousands, or even millions of independent functions.

A functional programming paradigm may have a notion of independent functions or processes. A functional process may consume inputs and produce outputs but may not change the state of other memory objects. In some embodiments, the processes may be rigidly defined as functional processes. Such embodiments may include functional programming languages, such as Erlang. Scala. F#, Lisp. Clojure, OCaml, Haskell, and others. In some cases, the processes may be written in a functional programming style where the programmer may adhere to a functional style even though a language, compiler, or other constraint may not enforce the functional style.

Figure 2:
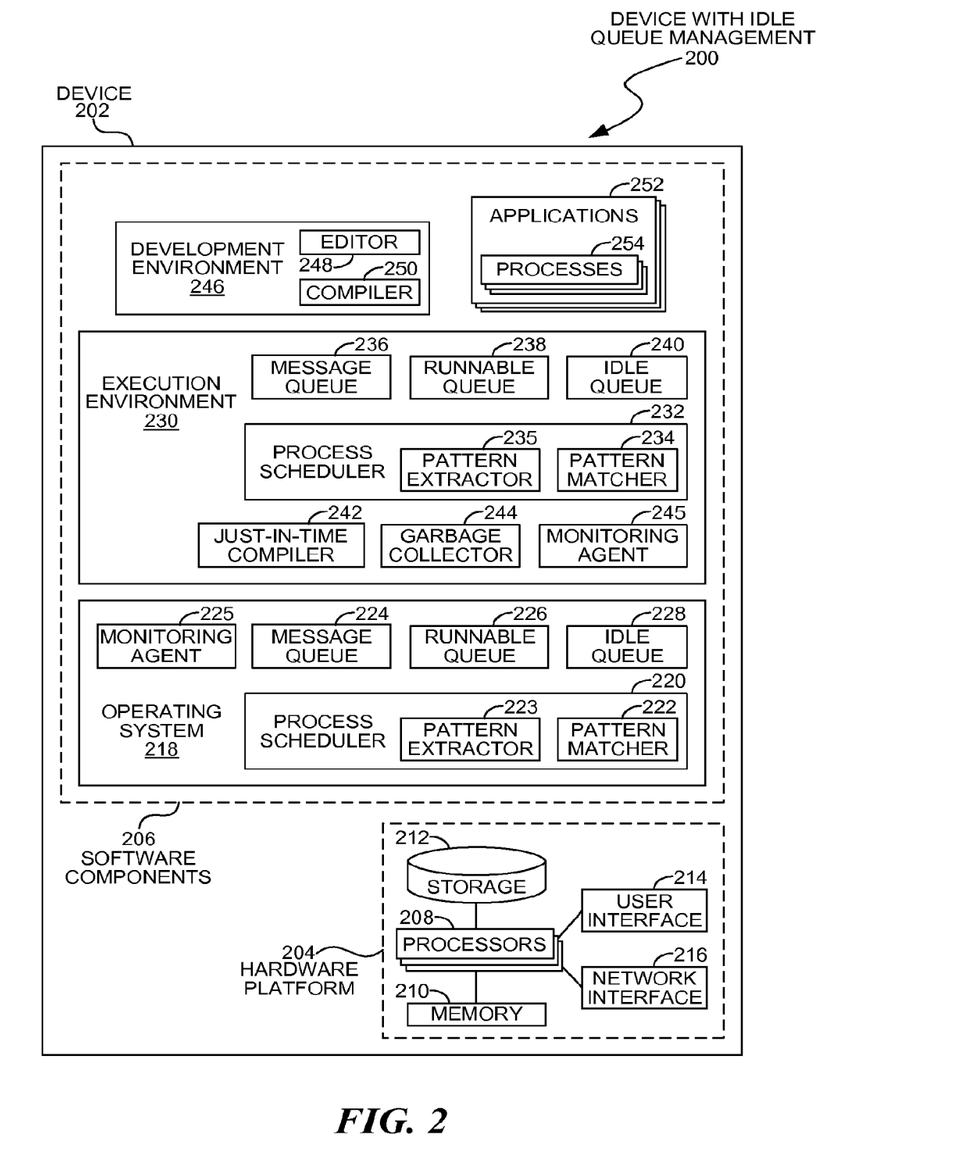
FIG. 2 is a diagram illustration of an embodiment showing a device with idle queue management.

FIG. 2 is a diagram of an embodiment 200 showing a computer system that may deploy a pattern matching system in a process scheduler. The pattern matching system may analyze inputs for which idle or blocked processes may be waiting. The pattern matching process may operate without awakening a blocked process.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various applications 252 and services may operate. An operating system may provide an abstraction layer between executing routines and the hardware components 204, and may include various routines and functions that communicate directly with various hardware components.

The operating system 218 may include a process scheduler 220, as well as other components. The operating system 218 may be an environment in which applications 252 may be executed. Each of the applications 252 may contain multiple processes 254 that may relate to each other.

The process scheduler 220 may cause the various processes 254 to be executed on the hardware platform 204. The process scheduler 220 may determine when a specific process is to be launched and may allocate or provision resources for the process. The process scheduler 220 may manage the execution of the processes by facilitating message passing between the processes. In some embodiments, the message passing may be explicit or implicit. Explicit message passing systems may have distinct messages that are routed to a receiving process, while implicit message passing embodiments may perform similar functions without the discrete messages.

The process scheduler 220 may have a pattern extractor 223. The pattern extractor 223 may be capable of determining input and output patterns for processes that may be executing or for processes that may be in a hold state. The pattern extractor 223 may examine source code, intermediate code, executable code, metadata, or other source to determine either or both of the input and output patterns.

The process scheduler 220 may have a pattern matcher 232 which may compare messages with waiting processes. When the pattern matcher 232 identifies a waiting process that may consume the message, the pattern matcher 232 may move the process to a runnable queue 238. When the pattern matcher 232 does not successfully match a message, the message may be moved to a message queue 224 for later processing.

The process scheduler 220 may identify processes that are waiting or have become blocked, and may place the processes in an idle queue 228. When processes are placed in the idle queue 228, the process scheduler 220 may also extract a pattern representing data, interrupts, or other information for which the process is waiting. The pattern may be placed in a process array for comparisons with messages in the message queue 224 or for comparisons with incoming messages.

In some embodiments, the process scheduler 220 may be part of an operating system 218. In other embodiments, the process scheduler 232 may be part of an execution environment 230.

The execution environment 230 may be separate from the operating system 218 and may be a virtual machine or other software construct that may manage execution of applications 252. In some embodiments, the execution environment 230 may have a just-in-time compiler 242, garbage collector 244, and other management functions.

The execution environment 230 may have a process scheduler 232 that includes a pattern matcher 234 and a pattern extractor 235. The execution environment 230 may also have a message queue 236, runnable queue 238, and an idle queue 240.

In some embodiments, a development environment 246 may be used by a developer or programmer to create applications 252. The development environment 246 may include an editor 248 where a programmer may create and modify source code, as well as a compiler 250 that may compile the source code into executable code. In some cases, the compiler 250 may create intermediate code that may be further compiled, such as intermediate code that may be compiled with a just-in-time compiler 242.

The compiler 242 may identify and extract pattern information from source code during compiling. The pattern information may be included in the compiled code or stored in a separate metadata file. In such embodiments, a process scheduler may access the stored pattern information when a process has halted, then use the stored pattern information to compare with messages.

Figure 3:
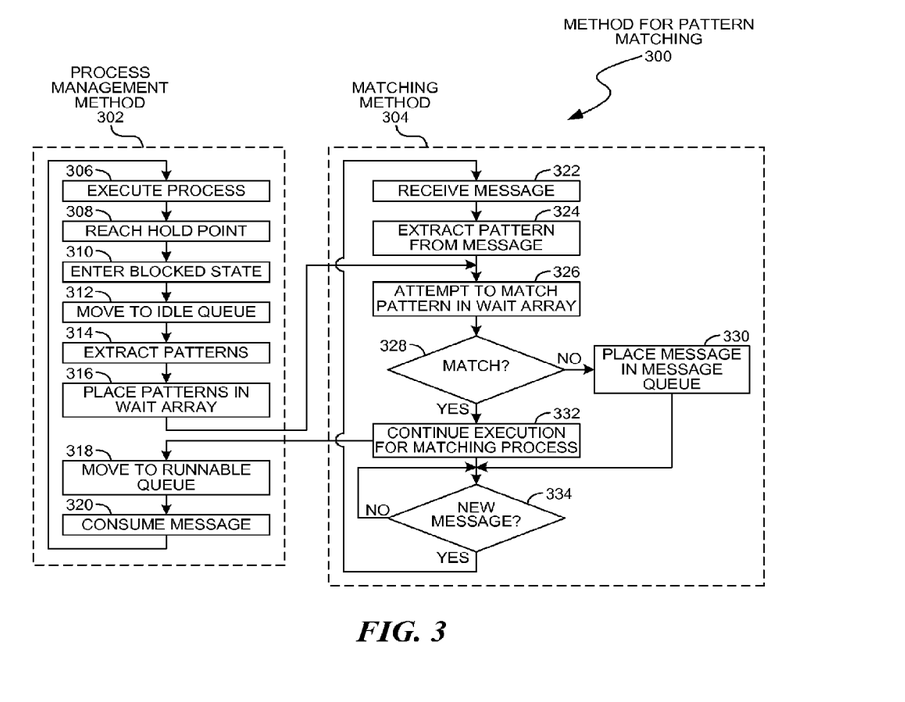
FIG. 3 is a flowchart illustration of an embodiment showing a method for matching messages to halted processes.

FIG. 3 is a flowchart illustration of an embodiment 300 showing a method for pattern matching. Embodiment 300 illustrates one method the may be performed by a process scheduler and a pattern matcher, such as the process schedulers 220 and 230, and the pattern matchers 222, and 232.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method that may be performed by a process scheduler and a pattern matcher. The process management method 302 may be performed by a process scheduler and may manage the various items in the idle queue and runnable queue. The matching method 304 may compare messages to patterns extracted from processes, and may disposition messages or processes accordingly.

The process management method 302 may begin when a process is executed in block 306. The process may execute until the process reaches a hold point in block 308, at which time the process may enter a blocked state in block 310 and moved to an idle queue in block 312.

The blocked state may be where a process awaits an input from some other source. In some situations, the input may be in the form of an explicit message, while other situations the input may be in the form of a blocked memory object, interrupt, or other input.

Patterns may be extracted by a process scheduler in block 314. In some cases, the pattern may be extracted from executable code for the process. In other cases, a metadata file or other source may contain the pattern that may be referenced by the process scheduler when a blocked state may be encountered. The patterns may include both input and output patterns for a process.

In some embodiments, a compiler may extract the patterns during compilation, and may then embed the patterns in the executable code. Such a compiler may store the embedded patterns in a manner so that the process scheduler may quickly identify a pattern at each potential hold location.

The extracted patterns may be placed in a process array in block 316.

Once a pattern is matched by the matching method 304, the process may be moved to a runnable queue in block 318 and the message may be consumed by the process in block 320 as it continues execution in block 306.

The pattern matcher may execute the matching method 304.

In block 322, a message may be received. The pattern associated with the message may be extracted in block 324.

In block 326, the pattern from the message may be attempted to be matched to patterns in the process array. If there is no match in block 328, the message may be placed in a message queue in block 330. If the match is successful in block 328, the matching process may resume execution in block 332. The process to continue execution may be to move the process to the runnable queue in block 318 and continue execution.

The pattern matcher may loop in block 334 until a new message may be received. When a new message is received in block 334, the process may continue in block 322.

The pattern matcher may respond to either new messages in block 334 or to new processes that are halted in block 326. In either case, an attempt may be made to match patterns in the process array and cause a waiting process to continue when the match is successful.

Figure 4:
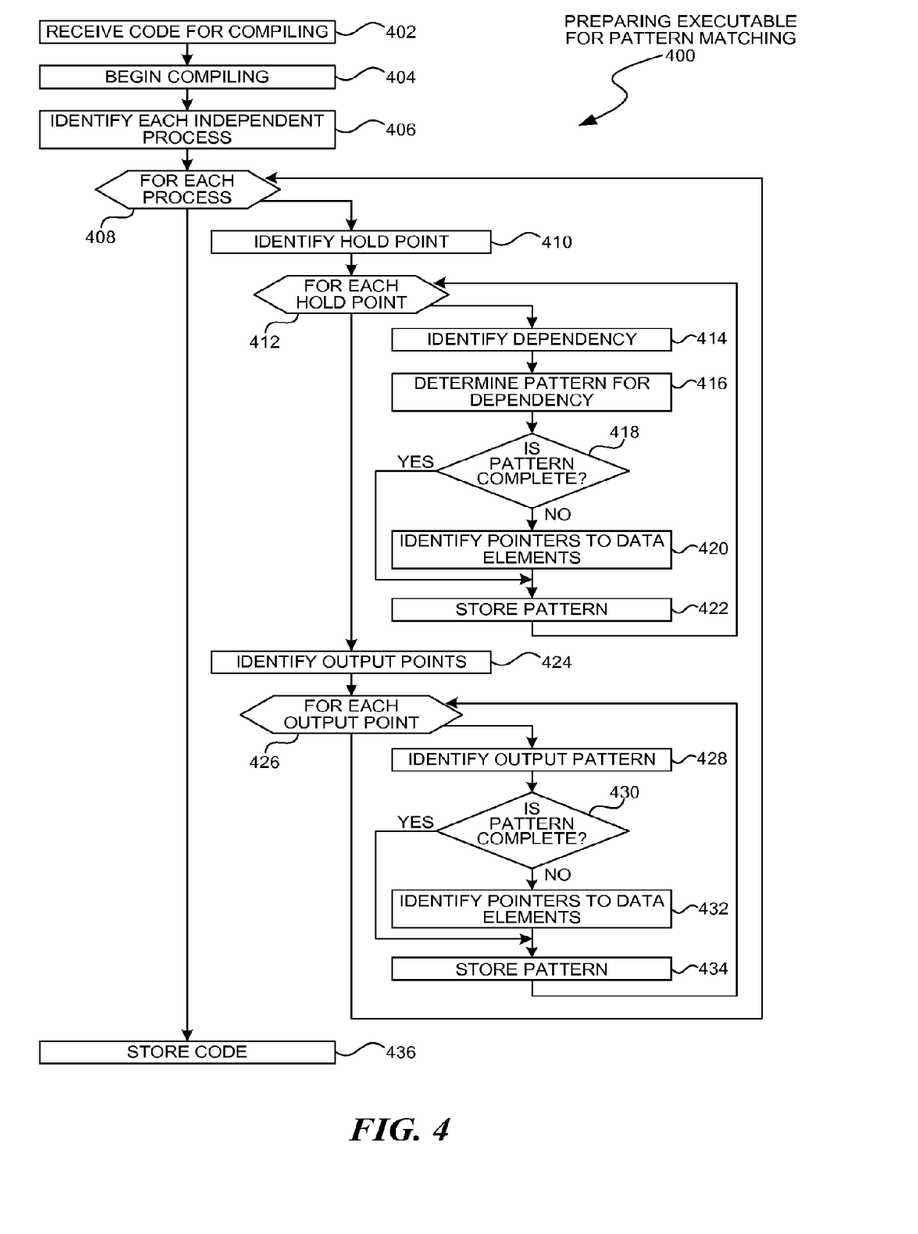
FIG. 4 is a flowchart illustration of an embodiment showing a method for preparing executable code for pattern matching.

FIG. 4 is a flowchart illustration of an embodiment 400 showing a method for preparing executable code for pattern matching. Embodiment 400 illustrates one method the may be performed by a compiler for identifying potential hold points, then embedding the patterns in a manner such that a process scheduler may retrieve the patterns.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The process of embodiment 400 may be performed at compile time to identify patterns that may be extracted at hold and at transmit points. The embodiment 400 may be performed at any compilation or analysis of code. In some cases, embodiment 400 may be performed when compiling from source code to executable code, while at other cases, embodiment 400 may be performed when compiling from source code to intermediate code, or from intermediate code to executable code.

The code may be received in block 402 for compiling, which may begin in block 404. During compiling, each independent process may be identified in block 406.

For each process in block 406, potential hold points may be identified. For each hold point in block 412, a dependency for the hold point may be identified in block 414. A pattern for the dependency may be determined in block 416.

In some cases, the pattern may define specific data elements that may make up a pattern. In other cases, the pattern may relate to data elements that may be known at runtime. When the data elements are fully defined, the pattern may be considered complete. When some or all of the data elements are defined at runtime, the pattern may be considered incomplete.

When the pattern is incomplete in block 418, pointers to the data elements may be identified in block 420.

The pattern may be stored in block 422. In some embodiments, the pattern may be embedded in the executable code. In other embodiments, the pattern may be stored in a separate file or database associated with the executable code.

In block 424, potential output points may be identified. For each output point in block 426, the output pattern may be identified in block 428. If the pattern is not complete in block 430, pointers to the data elements represented in the pattern may be created in block 432. The pattern may be stored in block 434.

After analyzing all of the hold points for all of the processes, the executable code may be stored in block 436 in preparation for execution.

Figure 5:
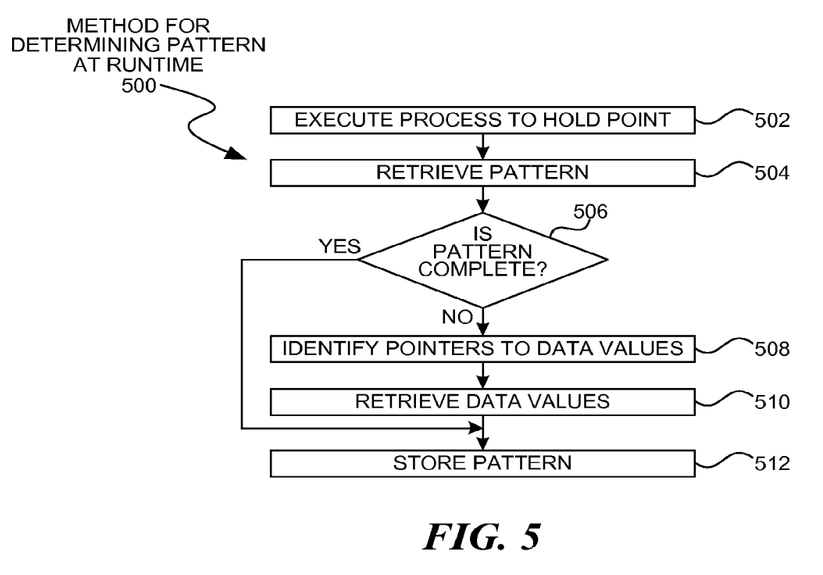
FIG. 5 is a flowchart illustration of an embodiment showing a method for determining a pattern at runtime.

FIG. 5 is a flowchart illustration of an embodiment 500 showing a method for extracting a pattern from a halted process. Embodiment 500 illustrates one method for determining a pattern by traversing pointers to data values. Such an embodiment may be useful when a pattern may not be fully defined a compile time and where some of the portions of the pattern may be defined at runtime.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A process may execute until a hold point in block 502. At the hold point, a pattern may be retrieved in block 504. In some cases, the pattern may be retrieved from the executable code, while in other cases the pattern may be retrieved from a metadata file, database, or other source.

If the pattern is complete in block 506, the pattern may be stored in block 512. If the pattern is not complete in block 506, pointers to data values for the pattern may be identified in block 508. The data values may be retrieved in block 510 and the pattern stored in block 512.

Embodiment 500 is an example of a process that may be performed when some of the data values for a pattern may be defined at runtime.

Figure 6:
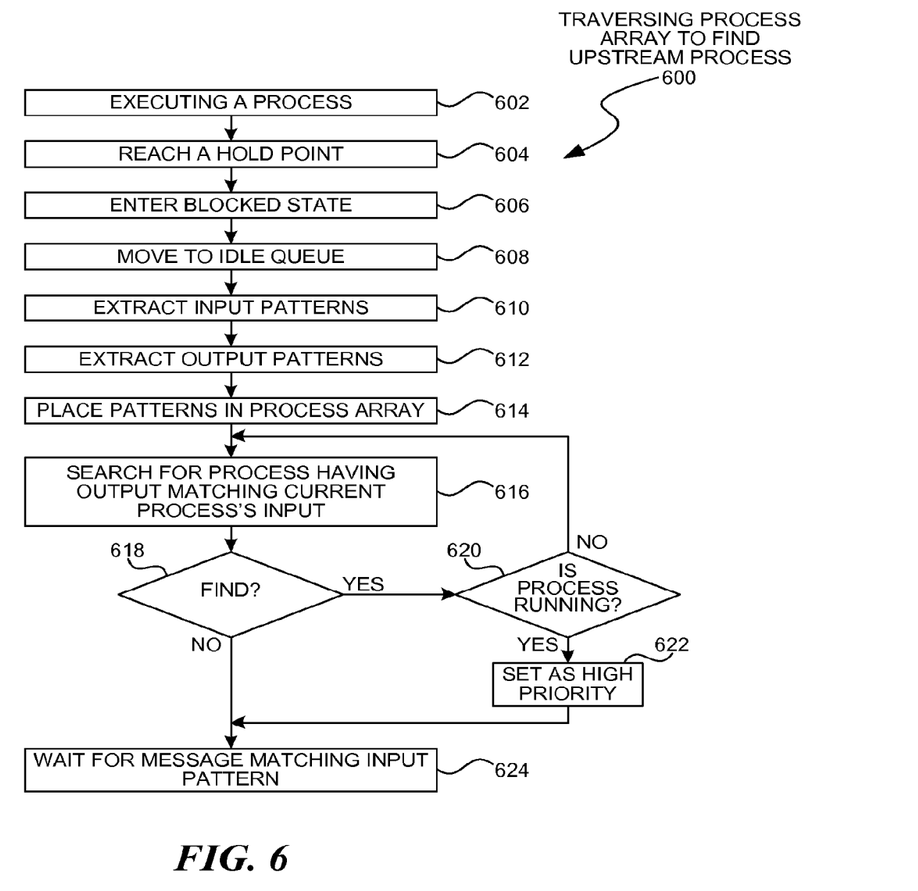
FIG. 6 is a flowchart illustration of an embodiment showing a method for traversing process array to find upstream processes.

FIG. 6 is a flowchart illustration of an embodiment 600 showing a method for traversing a process array to find upstream processes. Embodiment 600 illustrates a mechanism for recursively examining a process array to identify a chain of upstream processes for a given halted process. Once the upstream processes are identified, the processes may be expedited or prioritized so that the waiting process may be executed quickly.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A process may be executed in block 602 until the process reaches a hold point in block 604. The process may enter a hold state in block 606, and may be moved to an idle queue in block 608.

The input patterns may be extracted from the process in block 616, as well as the output patterns in block 612. The patterns may be placed in a process array in block 614.

The process array may be traversed in block 616 to identify processes having an output that matches the current process's input. When a match is found in block 618 and the newly identified process is running in block 620, the upstream process may be set as a high priority in block 622.

If an upstream process is not running in block 620, the process may return to block 616 to recursively examine inputs for the upstream process. The loop of blocks 616 through 620 may be repeated several times until an executing process may be identified. Each time the loop may be performed, an upstream dependency may be identified.

Once the upstream process has been set to a higher priority in block 622, the current process may wait in block 624 for a message that allows the process to continue. In the event that the search in block 616 did not identify any upstream processes, the process may also wait in block 624 for a message that allows the process to continue.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
   compiling source code into executable code;
   during said compiling, identifying a first transmission point, said first transmission point being a message passed to another process;
   for said first transmission point, identifying a first pattern defining a first output for said first transmission point;
   creating a first extractable annotation defining said first pattern; and
   storing said first extractable annotation.

2. The method of claim 1, said first pattern being executable code defining a condition for continuing said executable code at said first hold point.

3. The method of claim 1, said first source being a message received from a message created by an executing process.

4. The method of claim 3, said first source being a memory object populated by an executing process.

5. The method of claim 4, said executing process creating an interrupt when said memory object has been populated.

6. The method of claim 5, said executing process being a peripheral device.

7. The method of claim 5, said memory object being a direct memory access memory object.

8. The method of claim 1, said first extractable annotation comprising constants.

9. The method of claim 1, said first executable annotation comprising data types.

10. The method of claim 9, at least one of said data types having no value assigned during said compiling.

11. The method of claim 10, said at least one of said data types having a reference to a value, said value being defined at runtime.

12. The method of claim 1, said first source code being intermediate code.

13. The method of claim 12, said first pattern comprising a pattern element defined with a reference to a memory object.

14. The method of claim 13 further comprising: retrieving a value for said pattern element by traversing said reference to said memory object.

15. The method of claim 1, said compiling being performed at runtime.

16. The method of claim 1, said executable code being intermediate code.

17. The method of claim 1, said first extractable pattern being stored within said executable code.

18. The method of claim 17, said first extractable pattern being stored in an appendix to said executable code.

19. The method of claim 17, said first extractable pattern being stored in a location adjacent to said first hold point.

20. The method of claim 1, said first extractable pattern being stored in a metadata file, said metadata file being separate from said executable code.

21. The method of claim 20 further comprising: packaging said metadata file with said executable code.

22. The method of claim 1 further comprising:
identifying a second hold point, said second hold point being a dependency on a second input received from a second source;
for said second hold point, identifying a second pattern defining said second input for said second hold point;
creating a second extractable annotation defining said second pattern;
storing said second extractable annotation;
said first source being a message passing interface; and
said second source being a direct memory access object.

23. The method of claim 1, said first process being written in a functional language.

24. The method of claim 23, said functional language being one of a group composed of:
Erlang;
Scala;
F#;
Lisp;
Clojure;
OCaml; and
Haskell.

25. The method of claim 1, said first process being written in an imperative language.

* * * * *